United States Patent

[11] 3,598,060

| [72] | Inventor | John Chitra, Jr.<br>5801 S. Francisco, Chicago, Ill. 60629 |
|---|---|---|
| [21] | Appl. No. | 843,498 |
| [22] | Filed | July 22, 1969 |
| [45] | Patented | Aug. 10, 1971 |

[54] CONVEYOR STRUCTURE
10 Claims, 5 Drawing Figs.

[52] U.S. Cl. .................................................. 104/168,
104/106, 104/132, 198/177
[51] Int. Cl. .................................................. B65g 35/08
[50] Field of Search .................................. 104/95,
168, 172, 106, 107; 254/110; 198/177, 1, 132

[56] References Cited
UNITED STATES PATENTS

| 695,283 | 3/1902 | Cummings | 104/168 |
| 928,435 | 7/1909 | Felts | 104/107 X |
| 2,424,055 | 7/1947 | Rousseau | 198/108 |
| 3,048,123 | 8/1962 | Burmeister et al. | 104/88 |
| 3,127,006 | 3/1964 | Tochtermann et al. | 198/177 |
| 3,327,644 | 6/1967 | Black | 104/106 |

FOREIGN PATENTS

| 516,865 | 9/1955 | Canada | 104/107 |

*Primary Examiner*—Arthur L. La Point
*Assistant Examiner*—Robert Saifer
*Attorney*—Hill, Sherman, Meroni, Gross & Simpson ABSTRACT: For a conveyor system having track means and conveyor driving means, a train of freely separable conveyor units has means for guided running along track means. Means such as rack teeth on the units are engageable with driving gears for moving the train along the track. Each unit has means such as a ball for freely separable articulated thrusting contact with the next adjacent unit to enable movement around turns in the track. Any one or more of the units in the train may be freely switched from one track to another.

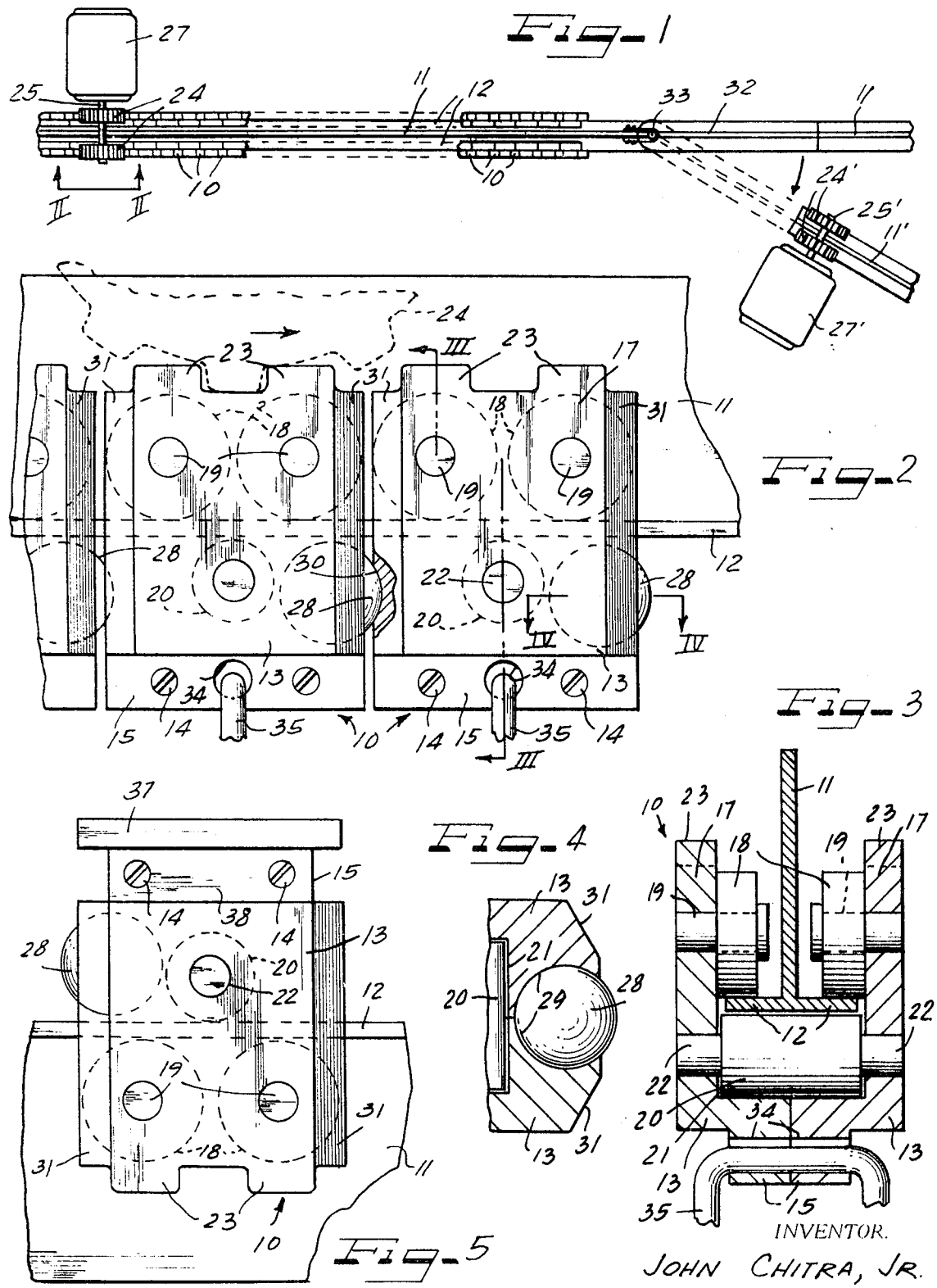

CONVEYOR STRUCTURE

This invention relates to conveyors of either the suspension or top-carrying type, and is more particularly concerned with novel construction of the individual conveyor units for freely separable articulated relation in a conveyor train of significantly greater versatility than heretofore available.

Characteristic of prior conveyors has been the connection of each unit of articulated section into a continuous chain by means of links, pins, and other coupling devices, such that removal of any unit from the chain has required some sort of physical disconnection or separation of elements, and then replacement of the removed unit or a coupling together of the units at either side of the removed unit, with appropriate tensioning adjustment of the conveyor into an endless chain.

According to the present invention the foregoing and other disadvantages of prior conveyors are overcome by a conveyor system having track means and conveyor driving means and in which a train of freely separable conveyor units has means for guided running along the track means. The units have means for engagement with the driving means for movement thereby of the train along the track means. Each unit is freely separably articulated with respect to the other units.

An important object of the present invention is to provide a new and improved conveyor structure in which individual conveyor units are freely separable with respect to each other.

Another object of the invention is to provide a conveyor train of freely separable and articulated units in thrusting contact with each other.

A further object of the invention is to provide a new and improved articulated conveyor construction having individual freely separable conveyor units.

Still another object of the invention is to provide a new and improved conveyor construction in which any one or more of freely separably articulated conveyor units may be separated, switched, realigned, and the like, with respect to a conveyor system, for utmost versatility.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary top plan view of a conveyor system embodying features of the invention;

FIg. 2 is an enlarged fragmentary side elevational view of the conveyor system taken generally in the plane of line II–II in FIG. 1;

FIg. 3 is a vertical sectional detail view taken substantially along the line III–III of FIG. 2;

FIG. 4 is a fragmentary horizontal sectional detail view taken substantially along the line IV–IV of FIg. 2; and FIG. 5 is a side elevational view of a modified conveyor unit.

Referring to FIGS. 1 and 2, a train of freely separable conveyor units 10 is adapted to be supported on and run along track means such as inverted T-shaped members 11 aligned end-to-end and provided with respective opposite side supporting track flanges 12.

For guided running of each of the units or sections 10 along the track 11, each of the units 10 has means for receiving the track flanges 12 and for antifriction running engagement therewith. To this end, each of the units 10 is constructed of a pair of separably secured complementary and preferably identical body members 13 (FIG. 3) secured together in aligned face-to-face relation as by means of screws 14 threadedly engaged into matching flanges 15 on one free edge of the body members between the opposite ends. Along their opposite edge portions, the body members 13 are provided with respective guide flanges 17 offset to their outer sides, such that in the assembly the flanges 17 are spaced apart sufficiently to provide a deep longitudinal slot for receiving the track flanges 12 freely therebetween. Antifriction running of each unit 10 along the track 11 is facilitated by an arrangement of rollers carried by the body of the unit and desirably comprising a pair of rollers 18 mounted on each of the flanges 17 in longitudinally spaced relation on respective inwardly projecting axles 19. Thereby, the rollers 18 are adapted to ride on the sides of the flanges 12 from which the web of the track 11 extends. To confront and, when desired, to ride the coplanar free side faces of the flanges 12, a transverse roller 20 is mounted in a clearance recess 21 adjacent to the bases of the flanges 17 and desirably centered longitudinally along the body relative to the rollers 18 so that a stabilized running gear is provided for the unit. Preferably the roller 20 has oppositely extending axles 22 rigid therewith journaled in the body members 13, although a pin type axle may be provided if preferred. While the conveyor unit 10 may be fully assembled and then run onto the track 11, the disclosed construction enables ready assembly of two halves of the unit onto the track and then securing them by means of the screws 14. Means are provided on the conveyor units 10 for engagement with driving means for movement of the train along the track. To this end, by way of example, rack teeth 23 are provided along the free edges of the flanges 17, that is, along the edge of each of the units 10 opposite to the attachment flange structure 15. Through this arrangement driving pinions 24 on a shaft 25 driven by a motor 27 are adapted to drive the train of conveyor units 10 along the track 11.

Means are provided on the conveyor units 10 for freely separable articulated thrusting contact with each other. In a desirable form, such means comprise a thrust ball 28 carried on one end of each of the units (FIGS. 2 and 4) in a socket 29 provided by equal matching semispherical recesses in the confronting portions of the body members 13 and spaced from the roller recess 21, with the ball socket opening outwardly from the associated end of the unit body so that the periphery of the ball projects a substantial distance beyond the end of the unit body to thrust against the next adjacent conveyor unit 10. For maximum thrust stability, the end of each of the conveyor unit bodies thrustingly engaged by the ball 28 of a companion unit is provided with a matching concave thrust bearing surface 30. This thrust surface 30 is shallow enough, or provided in a projecting portion of the body, so that sufficient clearance is maintained between the confronting ends of the conveyor units to enable relative articulated movement of the units in moving around turns or angular changes of direction along the conveyor track. For this purpose, also, at least the vertical corners of the body members 13 at the respective opposite ends of the unit are chamfered as indicated at 31 to facilitate lateral relative swinging of the units about the thrust bearing projection between contiguous units. For relatively short radius upward or downward diversion of the units from a straight path along the track 11, similar chamfering of the upper and lower corner portions of the ends of the unit bodies may be effected. If preferred, of course, the thrust projections on the conveyor units may be formed integrally in one piece thereon, but the thrust balls 28 enable hardened ball members to be employed while the body members 13 may be made from relatively softer materials which are readily cast or molded.

A salient advantage of the freely separable articulated thrusting contact between the units 10 resides in that any one or more of the units may be separated from the chain without requiring a physical disconnect of any securing elements between the units. For example, switching of the conveyor chain or any part of the chain may be effected selectively to different parts or runs of a conveyor system. As a typical example, a switch section 32 in the track 11 has a pivot 33 by which it is adapted to be swung to connect with a track branch 11' whereby any one or more of the conveyor units 10 can be diverted from the track 11 to the branch 11' which may be a siding or idle conveyor section or may be an active section having a motor 27' driving conveyor moving pinions 24' mounted on the shaft 25'. It will be understood that as many as needed of the motors 27 and 27' arranged for best efficiency may be employed in the conveyor system. Through this arrangement any one or more of the conveyor units 10 may be cut out of the conveyor chain onto the conveyor branch 11' and the remainder of the train moved on along the track 11 by operation of the switch 32, or the entire train may be diverted to the branch 11', as desired. Further, since the train of conveyor units may be driven in either direction, it is practical to assemble conveyor units from one or more track branches or tracks into a conveyor train by means of the switching structure. For this the motors 27, 27' may be of the reversible type. It will thus be seen that the present conveyor lends itself readily to pushbutton control from a master panel or console.

Use of the conveyor units 10 for suspension carrying or for top carrying by simple inversion is contemplated. Thus, in the arrangement shown in FIGS. 1—3, a suspension carrying arrangement is shown, wherein the flanges 15 have aligned openings 34 receptive of an article hanger 35, or any other suitable means for suspending articles from the conveyor may be provided.

For supporting articles on top of the conveyor, the units 10 and the conveyor 11 are inverted so that the track flanges 12 are on top of the track and the rollers 20 of the conveyor units ride on the flanges 12 while the rollers 18 serve as stabilizers under the track flanges. In this inverted arrangement, the rack teeth 23 project downwardly, instead of upwardly, and the upper ends of the conveyor units 10 carry suitable means for article transportation, such as respective head flange slat panels 37 mounted on the flanges 15 as by means of attachment flange structure 38 secured as by means of the screws 14.

I claim as my invention:

1. For a conveyor system having track means and conveyor driving means:
   a train of freely separable conveyor units in end-to-end relation and each having a body and means for guided running along the track means;
   means on said units for engagement with the driving means for movement thereby of the train along said track means; and
   means on said bodies of the units for freely separable articulated thrusting contact with each other comprising a thrusting and spacer projection extending a short distance from one end of each body and the opposite end of each body having a recessed bearing surface receptive of the projection of a contiguous unit in the train in freely separable thrusting and stabilizing relation, with each projection and bearing surface being cooperatively related to maintain a sufficient clearance between the confronting ends of the contiguous unit bodies to enable articulated movement of the units around turns or angular changes of direction along said track means.

2. Structure according to claim 1, wherein said recessed bearing surfaces are in the respective ends of the bodies to a depth which is substantially less than the extent of the respective projections from their surfaces of the bodies whereby to attain said clearance.

3. Structure according to claim 1, wherein said projections are balls, and said bodies have respective sockets therein within which the balls are mounted and from which the balls project to a limited chordal extent.

4. Structure according to claim 1, said ends of the bodies being chamfered at opposite sides of the projections and bearing surfaces to facilitate articulated movement of the units in angular changes or turns along the track means.

5. Structure according to claim 1, in which said bodies have upper and lower edges, one of which has means for supporting a load, and said projection and bearing surface on each of the bodies being adjacent to the load-supporting edge of the respective body.

6. Structure according to claim 1, each of said bodies having opposite edges, one of said edges having means for supporting a load, and the other of said edges having rack teeth thereon engageable with driving pinion means.

7. A conveyor unit for a conveyor system having track means and conveyor driving means, comprising:
   a conveyor unit adapted to be used in a train of freely separable similar units in end-to-end relation;
   said unit having a body and means for guided running along track means;
   means on said body for engagement with driving means for movement along the track means; and
   means on said body for freely separable articulated thrusting contact with contiguous units at opposite ends of the body comprising a thrusting and spacer projection extending a short distance from one end of the body and the opposite end of the body having a bearing surface against which the projection of a contiguous unit is adapted to engage separably;
   said projection comprising a ball and said body having a socket within which said ball is mounted with a chordal portion of the ball projecting from the socket and engageable with the bearing surface of a contiguous unit.

8. A unit according to claim 7, in which said bearing surface is a shallow concave recess complementary to the chordal portion of the ball projection.

9. A unit according to claim 8, having upper and lower edges, one of said edges having means for supporting a load, and said projection and said bearing surface being on the portion of the body adjacent to the load-supporting edge.

10. A unit according to claim 7, having opposite edges extending between said ends, one of said edges having means thereon for supporting a load, and rack teeth on the opposite edge adapted to mesh with a driving pinion of driving means.